United States Patent
Himmelmann et al.

(10) Patent No.: US 10,933,981 B2
(45) Date of Patent: *Mar. 2, 2021

(54) AERODYNAMIC NOISE REDUCING THIN-SKIN LANDING GEAR STRUCTURES AND MANUFACTURING TECHNIQUES

(71) Applicant: Goodrich Corporation, Charlotte, NC (US)

(72) Inventors: Richard A. Himmelmann, Beloit, WI (US); Stephen E. Tongue, Hampden, MA (US)

(73) Assignee: GOODRICH CORPORATION, Charlotte, NC (US)

( * ) Notice: Subject to any disclaimer, the term of this patent is extended or adjusted under 35 U.S.C. 154(b) by 1227 days.

This patent is subject to a terminal disclaimer.

(21) Appl. No.: 15/188,651

(22) Filed: Jun. 21, 2016

(65) Prior Publication Data

US 2017/0361923 A1    Dec. 21, 2017

(51) Int. Cl.
*B64C 25/00* (2006.01)
*B64C 25/60* (2006.01)
(Continued)

(52) U.S. Cl.
CPC .............. *B64C 25/00* (2013.01); *B23K 9/044* (2013.01); *B23K 9/173* (2013.01); *B23K 9/23* (2013.01);
(Continued)

(58) Field of Classification Search
CPC ......... B64C 25/60; B64C 25/58; B64C 25/34; B64C 25/16; B64C 25/12; B64C 25/10;
(Continued)

(56) References Cited

U.S. PATENT DOCUMENTS

| | | | |
|---|---|---|---|
| 2,010,945 A | * | 8/1935 | Carleton ................. B64C 25/16 244/109 |
| 2,129,824 A | | 9/1938 | De Seversky |

(Continued)

FOREIGN PATENT DOCUMENTS

| | | |
|---|---|---|
| EP | 0846540 | 6/1998 |
| GB | 1040424 | 8/1966 |

(Continued)

OTHER PUBLICATIONS

Wang; Fude et al. "Microstructure and Mechanical Properties of Wire and Arc Additive Manufactured Ti—6Al—4V" Feb. 2013. Metallurgical and Materials Transactions A, vol. 44A, Issue 2, pp. 968-977. https://doi.org/10.1007/s11661-012-1444-6 (Year : 2013).*

(Continued)

*Primary Examiner* — Richard R. Green
(74) *Attorney, Agent, or Firm* — Snell & Wilmer L.L.P.

(57) ABSTRACT

A thin-skin support member is provided. The thin-skin support member may include a semi-circular edge and a flat edge that define a hollow cavity. A cylindrical cavity may be adjacent the hollow cavity and at least partially defined by the semi-circular edge. The cylindrical cavity may be configured to retain a strut assembly. A mounting interface may be coupled to the semi-circular edge and the flat edge. A torsion interface may be disposed adjacent the cylindrical cavity and configured to receive a torsion link. The thin-skin support member may be made using additive manufacturing and thus may have a grain structure grown in the direction of material being added.

20 Claims, 8 Drawing Sheets

(51) Int. Cl.
*B33Y 80/00* (2015.01)
*B23K 9/04* (2006.01)
*B64C 25/10* (2006.01)
*B64C 25/34* (2006.01)
*B33Y 10/00* (2015.01)
*B23K 31/02* (2006.01)
*B23K 9/23* (2006.01)
*B23K 15/00* (2006.01)
*B23K 9/173* (2006.01)
*B23K 101/00* (2006.01)
*B23K 103/10* (2006.01)
*B23K 103/14* (2006.01)

(52) U.S. Cl.
CPC ...... *B23K 15/0086* (2013.01); *B23K 15/0093* (2013.01); *B23K 31/02* (2013.01); *B33Y 10/00* (2014.12); *B33Y 80/00* (2014.12); *B64C 25/10* (2013.01); *B64C 25/34* (2013.01); *B64C 25/60* (2013.01); *B23K 2101/006* (2018.08); *B23K 2103/10* (2018.08); *B23K 2103/14* (2018.08); *B64C 2025/003* (2013.01); *B64C 2025/006* (2013.01)

(58) Field of Classification Search
CPC ........ B64C 2025/006; B64C 2025/003; B64C 7/00
See application file for complete search history.

(56) References Cited

U.S. PATENT DOCUMENTS

| | | |
|---|---|---|
| 2,395,690 A | 2/1946 | Smith |
| 3,173,633 A * | 3/1965 | Alvarez-Calderon ...................... B64C 25/12 244/102 R |
| 6,349,901 B1 | 2/2002 | Grossman |
| 8,490,914 B2 | 7/2013 | Chow et al. |
| 9,952,572 B2 * | 4/2018 | Potter ................ G05B 19/4099 |
| 10,315,755 B2 * | 6/2019 | Himmelmann ......... B64C 25/02 |
| 2010/0155529 A1 | 6/2010 | Chow |
| 2014/0053623 A1 | 2/2014 | Hebrard |
| 2016/0089721 A1 | 3/2016 | Collins |
| 2017/0203386 A1 * | 7/2017 | Satoh ................ B23K 26/3576 |
| 2017/0234837 A1 * | 8/2017 | Hall .......................... B06B 3/00 73/602 |

FOREIGN PATENT DOCUMENTS

| | | | |
|---|---|---|---|
| GB | 1040424 A * | 8/1966 | ............. B64C 25/60 |
| WO | 2015053940 | 4/2015 | |

OTHER PUBLICATIONS

WAAM Article, Titanium Europe 2015—International Titanium Association, May 11-13, 2015, entitled, Manufacture of Complex Titanium Parts Using Wire+Arc Additive Manufacture, by Adrian Addison, Jialuo Ding, Filomeno Martina, Helen Lockett, Stewart Williams (34 pages).
European Patent Office, European Search Report dated Mar. 9, 2018 in Application No. 17176982.1-1010.
European Patent Office, European Office Action dated Oct. 24, 2019 in Application No. 17176982.1.

* cited by examiner

US 10,933,981 B2

AERODYNAMIC NOISE REDUCING THIN-SKIN LANDING GEAR STRUCTURES AND MANUFACTURING TECHNIQUES

FIELD

The disclosure relates generally aircraft landing gear, with various embodiments relating to thin-skinned landing gear structures.

BACKGROUND

Aircraft designers have continuously tried to increase the fuel efficiency of aircraft over the last century. The fuel efficiency of an aircraft may be related to the aircraft's mass and aerodynamic drag. In addition, noise regulations for aircraft at low altitudes encourage reduction of the aircraft's noise signature while it is near the ground. Landing gear can be heavy and aerodynamically resistant. Additionally, deployed landing gear may increase the noise signature of an aircraft as a result of air rushing passed the deployed gear.

SUMMARY

A thin-skin support member is provided. The thin-skin support member may include a semi-circular edge and an elongated edge that define a hollow cavity. A cylindrical cavity may be adjacent the hollow cavity and at least partially defined by semi-circular edge. The cylindrical cavity may be configured to retain a strut assembly. A mounting interface may be coupled to the semi-circular edge and the flat edge. A torsion interface may be disposed adjacent the cylindrical cavity and configured to receive a torsion link. The thin-skin support member has a grain structure grown in the direction of material being added.

In various embodiments, the thin-skin support member may be made using wire arc additive manufacturing, electron beam additive manufacturing, or other suitable additive manufacturing techniques. The thin-skin support member may include aluminum, titanium, or any other suitable metal. A deposit width of the wire arc additive manufacturing may be 3.5 mm or less, for example, or may be larger or smaller. A cylindrical cavity may extend from the mid-body support. The flat edge may have a yield strength ranging from 105 MPa to 121 MPa. The flat edge may have an ultimate tensile strength ranging from 257 MPa to 263 MPa. These material characteristics are given for exemplary purpose and may vary with differing materials as they are material-dependent characteristics.

A landing gear assembly is also provided. The landing gear assembly may include a thin-skin support member defining a hollow cavity and a cylindrical cavity. The thin-skin support member may have a grain structure grown in the direction of material being added. A cylinder may extend from the cylindrical cavity and an axle may extend from the cylinder. A torsion link may be coupled to the axle and a torsion interface of the thin-skin support member.

In various embodiments, the thin-skin support member may be made using wire arc additive manufacturing and may be at least one of aluminum or titanium. A deposit width of the wire arc additive manufacturing is 3.5 mm or less. An edge of the thin-skin support member may have a yield strength ranging from 105 MPa to 121 MPa. The edge may also have an ultimate tensile strength ranging from 257 MPa to 263 MPa. A mid-body support, wherein the cylindrical cavity extends from the mid-body support.

A method of making a thin-skin support member is also provided. The method includes the steps of selecting a metal, and forming the thin-skin support member from the metal. The thin-skin support member may define a hollow cavity and a cylindrical cavity proximate the hollow cavity.

In various embodiments, forming the thin-skin support member may further comprise using wire arc additive manufacturing to form the thin-skin support member. The thin-skin support member may have a yield strength ranging from 105 MPa to 121 MPa. The thin-skin support member may also have an ultimate tensile strength ranging from 257 MPa to 263 MPa. Forming the thin-skin support member may also comprise machining the thin skin support member from a block of the metal, wherein the metal is aluminum.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to landing gear assemblies having aerodynamic thin-skin support members, in accordance with various embodiments. Landing gear assemblies may have reduced weight and improved stress distribution by using a hollow-bodied, thin-skin support member to provide the primary vertical support. This thin-skin design uses thin skin construction, similar to wing design, to distribute the forces along a greater surface area and thereby enable a reduced cross-section area, which reduces the overall mass of the landing gear. This concept also produces a smooth, aerodynamic structure, which reduces drag and noise production due to aerodynamic buffeting. Hydraulic lines and landing gear wiring harnesses can be routed through the empty space within the landing gear structure. Internal routing may protect the equipment from environmental damage, while also reducing the aircraft's aerodynamic drag and noise production.

Figure 1:
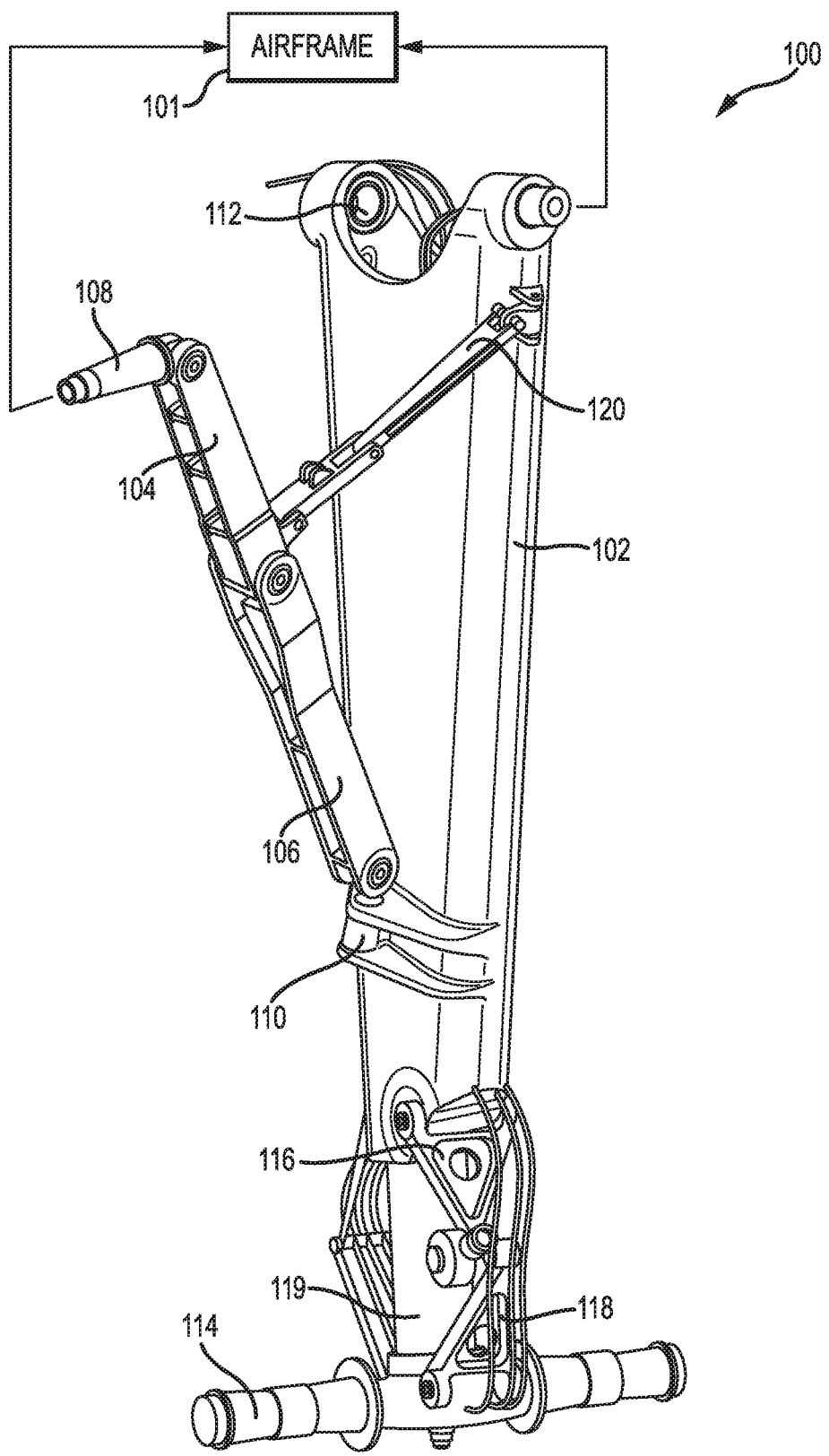
FIG. 1 illustrates a thin-skin landing gear assembly, in accordance with various embodiments.
Figure 2:
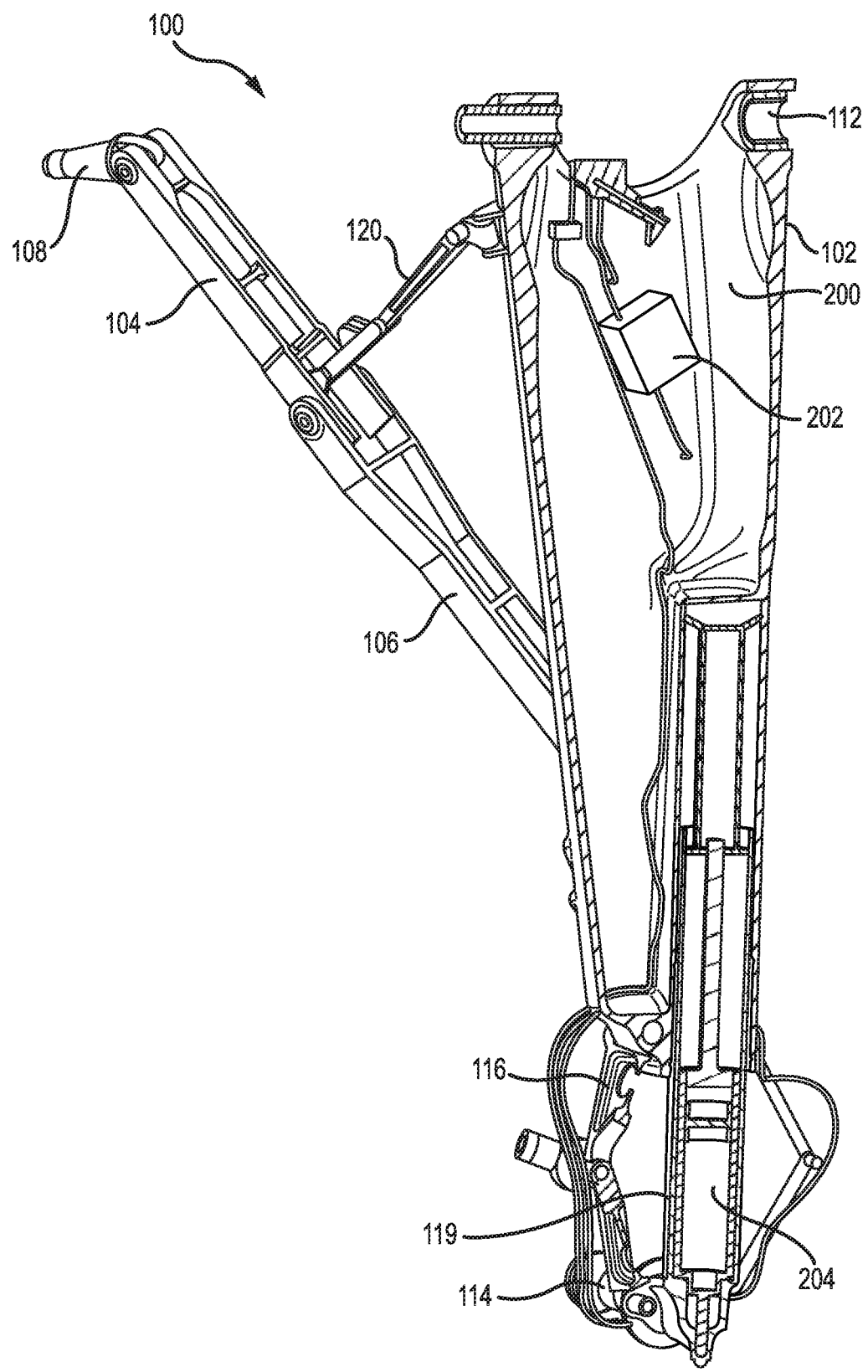
FIG. 2 illustrates a sectional view of a thin-skin landing gear assembly having an internal cavity, in accordance with various embodiments.

With reference to FIGS. 1 and 2, landing gear assembly 100 is shown, in accordance with various embodiments. Landing gear assembly 100 may include thin-skin support member 102 to provide light-weight support for landing gear assembly 100. Thin-skin support member 102 may be pivotally coupled to support arm 106 at mounting location 110 of thin-skin support member 102. Support arm 106 may further be pivotally coupled to linkage 104, which is pivotally coupled to interface structure 108. A secondary support arm 120 may be mechanically coupled to support arm 106 and thin-skin support member 102. Thin-skin support member 102, support arm 106, and secondary support arm 120 may form a triangular support structure.

In various embodiments, landing gear assembly 100 may be pivotally coupled to an airframe 101 at mounting interface 112. Landing gear assembly may also be coupled to airframe 101 at interface structure 108. Landing gear assembly may deploy and stow by pivoting about mounting interface 112 in response to translation of interface structure 108. Thin-skin support member 102 may at least partially contain cylinder 119 extending from thin-skin support member 102. Cylinder 119 may be a cylindrical member that is substantially perpendicular to axle 114. A wheel assembly may be coupled to axle 114 and configured to roll while supporting the weight of the aircraft.

In various embodiments, upper torsion link 116 may be pivotally coupled to thin-skin support member 102 at two vertices of upper torsion link 116. Upper torsion link 116 may resemble an isosceles triangle or an equilateral triangle, with one vertex of upper torsion link 116 pivotally coupled to one vertex of lower torsion link 118. Lower torsion link 118 may also resemble an isosceles triangle or an equilateral triangle, with two vertices of lower torsion link 118 mechanically coupled to axle 114. Upper torsion link 116 and lower torsion link 118 may be configured to pivot in response to translation of cylinder 119 into and/or out from a cylindrical cavity of thin-skin support member 102, as shown in greater detail below.

Referring now to FIG. 2, a partial cross-section of landing gear assembly 100 through thin-skin support member 102 is shown, in accordance with various embodiments. Thin-skin support member 102 defines cavity 200. Cavity 200 may contain internal hydraulic and/or electronic components 202. Cavity 200 may also remain hollow and retain air. Strut assembly 204 may be retained in place by internal walls of thin-skin support member 102, as described in greater detail below. The upper torsion link 116 and lower torsion link 118 may be configured to restrict the twisting of strut assembly 204 (and cylinder 119 and axle 114 of FIG. 1) with respect to thin-skin support member 102.

Figure 3A:
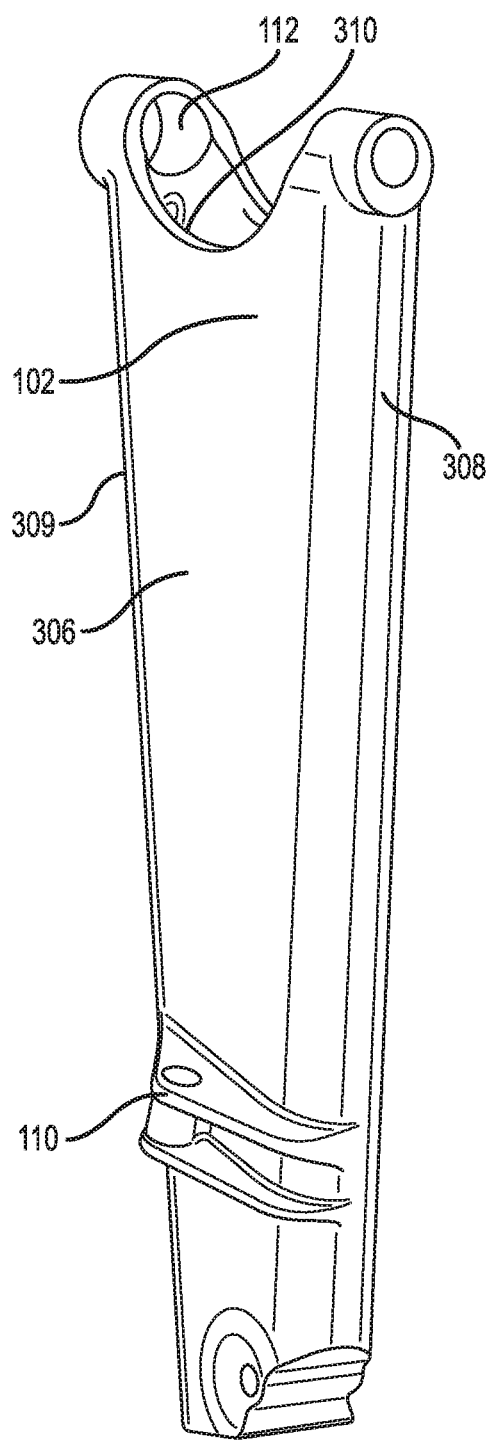
FIG. 3A illustrates a perspective view a thin-skin vertical support member, in accordance with various embodiments.
Figure 3B:
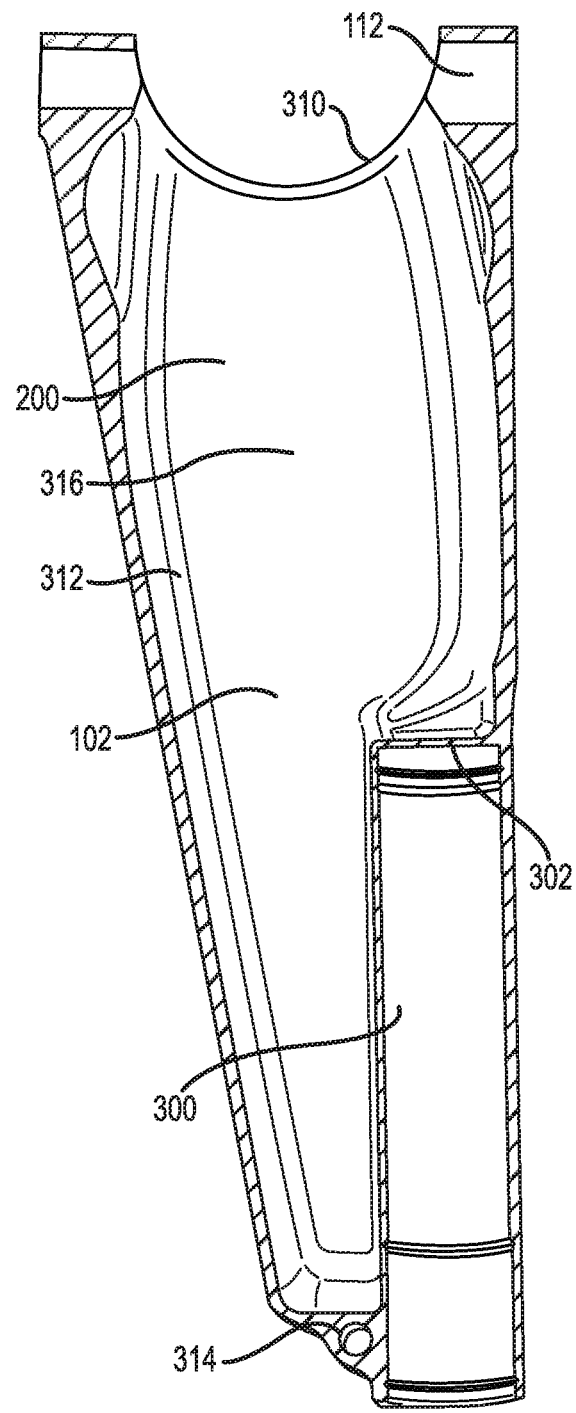
FIG. 3B illustrates a sectional view of a thin-skin support member having an internal cavity, in accordance with various embodiments.

With reference to FIGS. 3A and 3B, thin-skin support member 102 is shown, in accordance with various embodiments. Thin-skin support member 102 may include a semi-circular edge 308 adjacent to an elongated surface 306 extending to semicircular edge 309. Elongated surface 306 may be a large-radius rounded surface appearing flattened relative to semi-circular edge 309. Elongated surface 306 may also be a straight face, or a combination of radial surfaces and flat surfaces. Semi-circular edge 308 and semi-circular edge 309 may be oriented on the forward and/or aft end of thin-skin support member 102 such that air passing by thin-skin support member 102 moves from a semicircular edge, across the elongated surface, to another semicircular edge. Thin-skin support member 102 may thus define cylindrical cavity 300 internal to thin-skin support member 102 and adjacent to cavity 200. Cylindrical cavity 300 may be configured to retain strut assembly 204 of FIG. 2 and/or engage cylinder 119 of FIG. Thus, cylindrical cavity 300 may terminate at circular internal wall 302. Cylindrical cavity 300 may be partially defined by the internal surface of semi-circular edge 308.

In various embodiments, cavity 200 may be at least partially defined by internal surface 316 of elongated surface 306 and internal surface 312 of semi-circular edge 308. Thin-skin support member 102 may also include mounting interface 112 for coupling to an aircraft. Torsion interface 314 may be disposed adjacent cylindrical cavity 300 and configured to receive upper torsion link 116 of FIG. 1. Thin-skin support member 102 may also include a cutaway section 310 having circular and/or semicircular geometry to reduce weight of thin-skin support member 102.

Figure 4A:
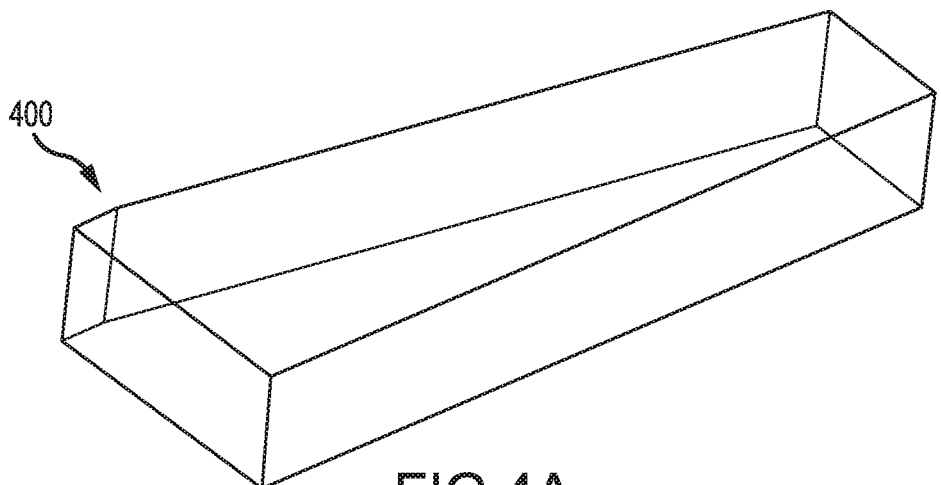
FIGS. 4A, 4B, and 4C illustrate a process of machining a thin-skin support member from a metal block, in accordance with various embodiments.
Figure 4B:
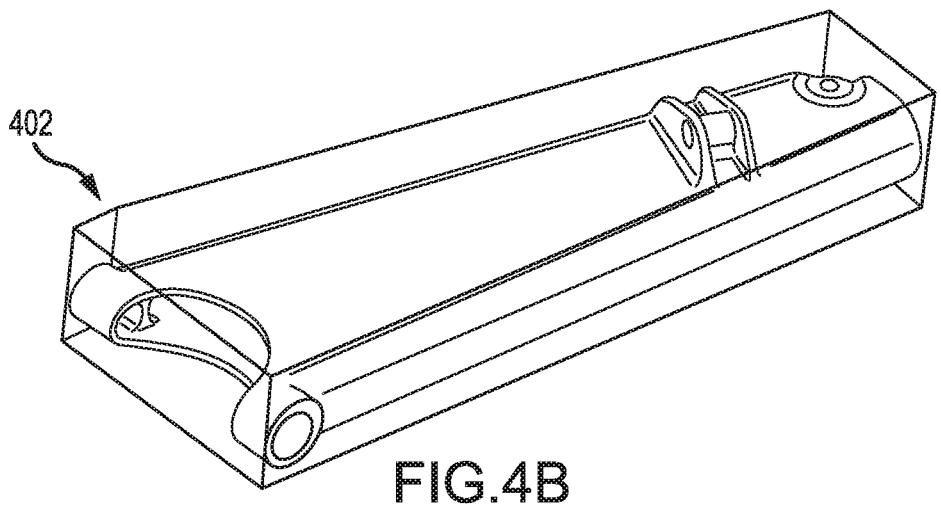
Figure 4C:
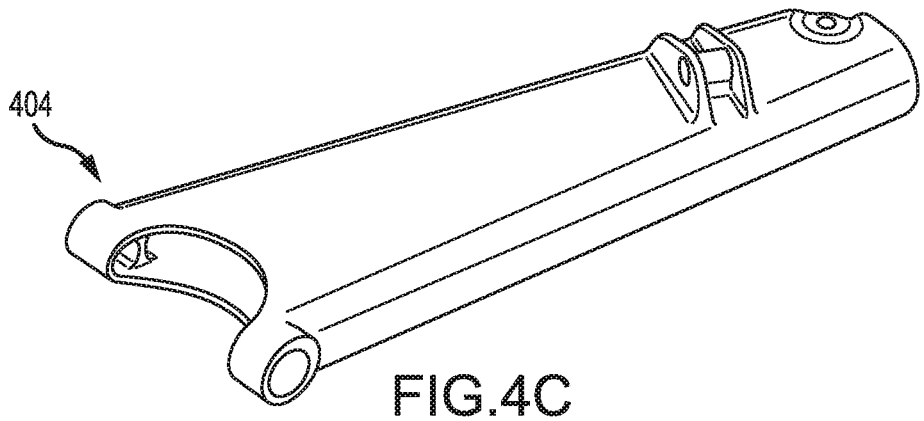

Referring now to FIGS. 4A, 4B, and 4C, an exemplary process for making thin-skin support member 102 by machining is shown, in accordance with various embodiments. Block 400 of metal may be prepared for machining, as shown in FIG. 4A. The metal block may include aluminum, titanium, steel, or any other metal or metal alloy desired for thin-skin support member 102 of FIG. 1. The use of aluminum for thin-skin support member 102 may reduce weight of landing gear assembly 100 in FIG. 1 by approximately 19% over conventional designs. The use of titanium for thin-skin support member may reduce the weight of landing gear assembly 100 in FIG. 1 by approximately 53% over conventional designs.

In various embodiments, and with reference to FIGS. 4A and 4B, portions of block 400 may be machined away to leave intermediate support member 402. Intermediate 402 may be machined until support member 404 of FIG. 4C remains. In various embodiments, support member 404 remaining after machining may comprise approximately 12%, 10%-15%, or 8%-20% of the mass initially present in block 400 of metal.

Figure 5:
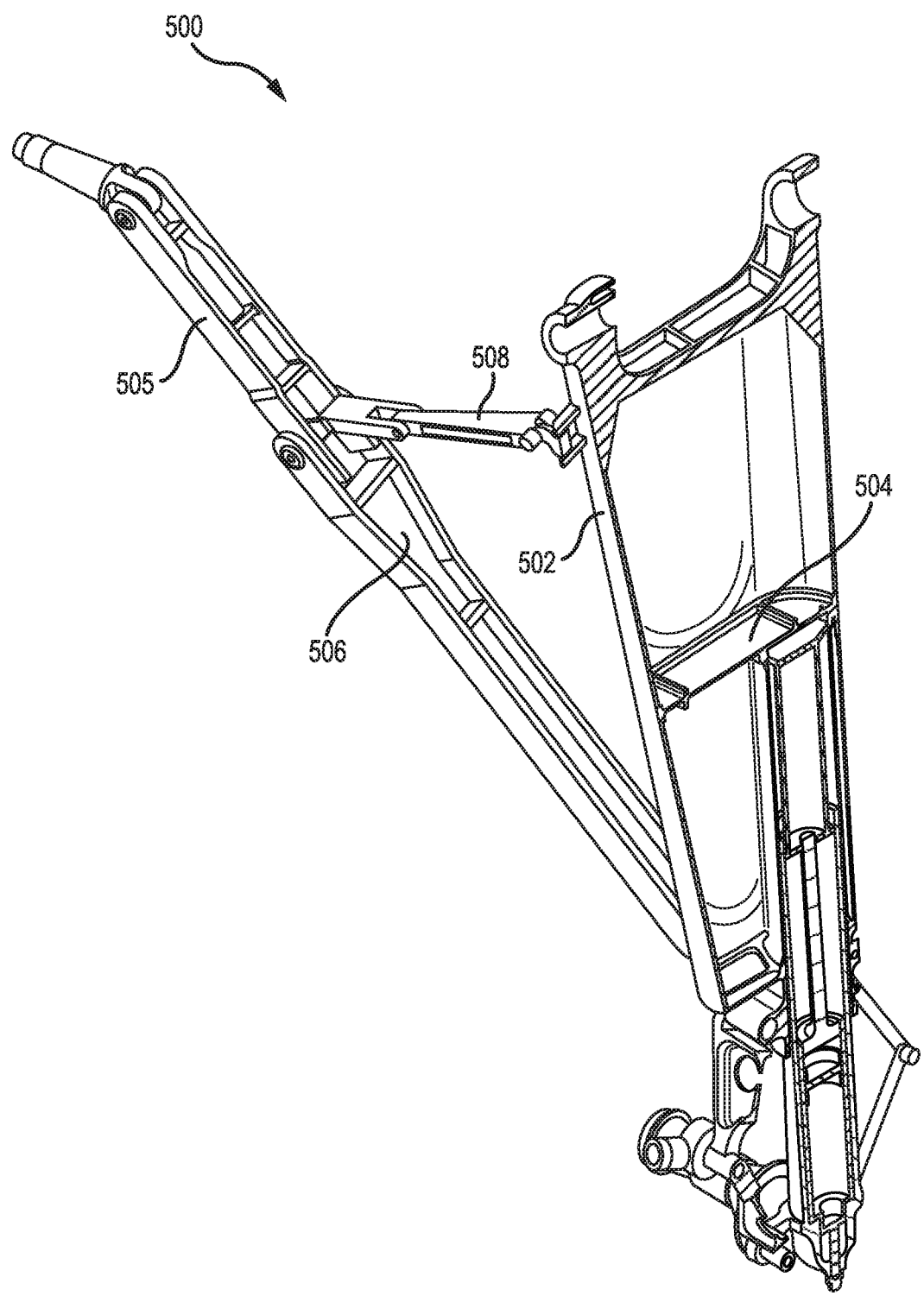
FIG. 5 illustrates a partial sectional view of a thin-skin landing gear assembly having a mid-body support member, in accordance with various embodiments.

Referring now to FIG. 5, an exemplary landing gear assembly 500 is shown, in accordance with various embodiments. Landing gear assembly 500 may be similar to thin-skin support member 102 of FIG. 1. Landing gear assembly 500 may include thin-skin support member 502 having mid-body support 504 disposed inside of thin-skin support member 502. Thin-skin support member 502 may be pivotally coupled to support arm 506, which is pivotally coupled to linkage 505. Secondary support arm 508 may also be coupled to linkage 505. Landing gear assembly 500 may thus deploy and retract in a manner similar to that of landing gear assembly 100 of FIG. 1.

Figure 6A:
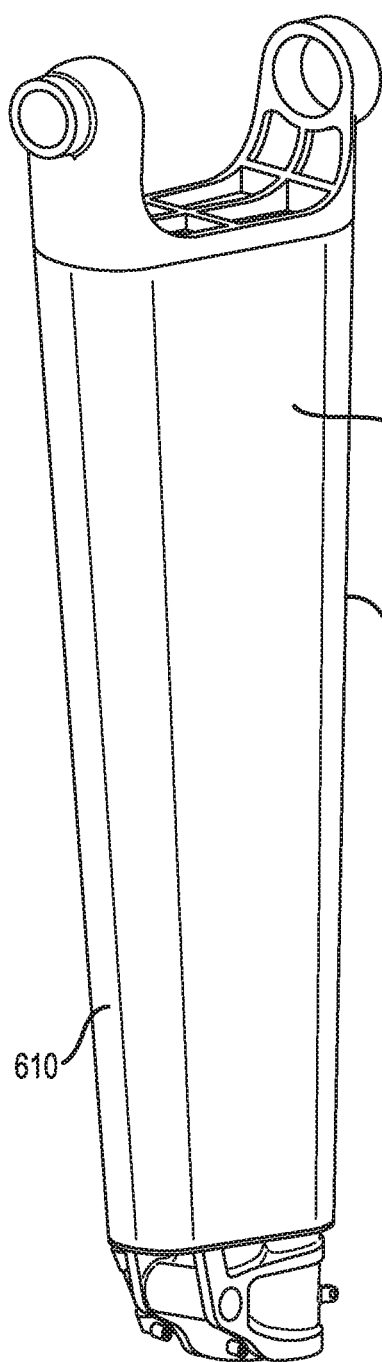
FIG. 6A illustrates perspective view of a thin-skin support member having mid-body support member, in accordance with various embodiments.
Figure 6B:
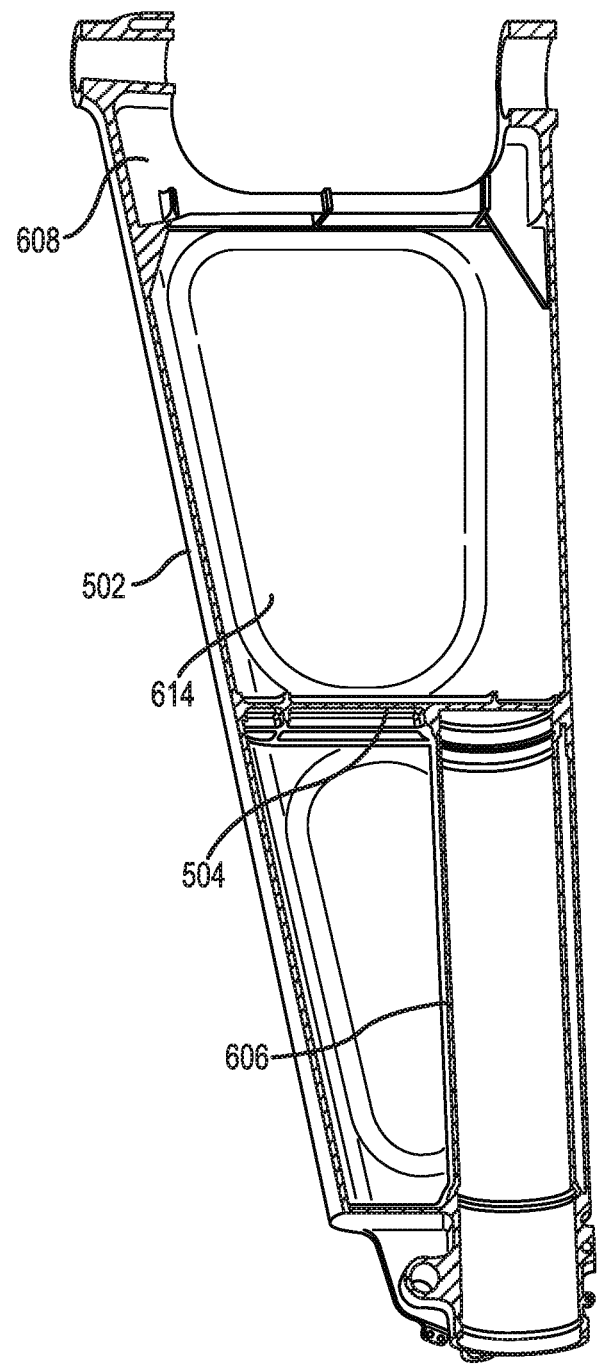
FIG. 6B illustrates cross-sectional view of a thin-skin support member having mid-body support member, in accordance with various embodiments.

Referring now to FIGS. 6A and 6B, thin-skin support member 502 is shown, in accordance with various embodiments. Thin-skin support member 502 may include semicircular edge 610 adjacent elongated surface 612. An internal surface 614 of elongated surface 612 may define an internal cavity of thin-skin support member 502. An interface portion 608 of thin-skin support member 502 may be configured for coupling to an aircraft. Interface portion 608 may include a cutaway to reduce the weight of thin-skin support member 502.

In various embodiments, thin-skin support member 502 may include mid-body support 504 extending completely across internal surface 614. Mid-body support 504 may define a terminus of cylinder 606. Cylinder 606 may extend from mid-body support 504 and be configured to retain a strut assembly similar to strut assembly 204 of FIG. 2. An interface configured for joining to a torsion link may be included proximate an opening end of cylinder 606.

Figure 7:
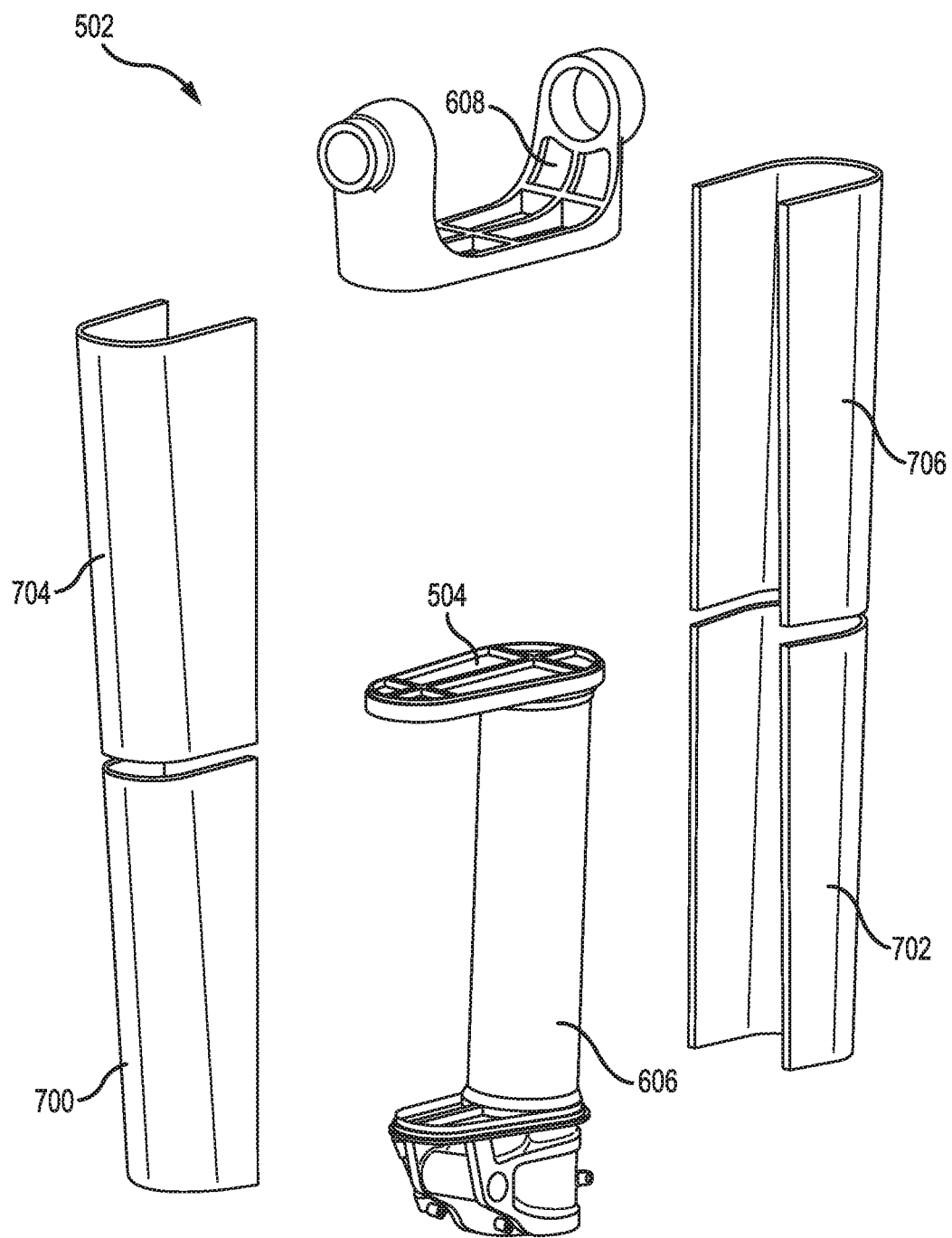
FIG. 7 illustrates an exploded view of metal components configured for welding to form a thin-skin support member, in accordance with various embodiments.

In various embodiments, and with reference to FIG. 7, exemplary components of thin-skin support member 502 are shown, in accordance with various embodiments. Thin-skin support member 502 may be assembled by welding or otherwise joining the components illustrated in FIG. 7. Interface portion 608 and mid-body support 504 may be forged components. Interface portion 608 and mid-body support 504 may be joined by welding to sheet metal elements. Lower curved segment 700 and lower curved segment 702 may be welded or joined to each other as well as to mid-body support 504 and/or cylinder 606. Lower curved segment 700 may also be welded or joined to upper curved segment 704. Lower curved segment 702 may further be welded or joined to upper curved segment 706. Upper curved segment 704 and upper curved segment 706 may be welded or joined to interface portion 608. In various embodiments, the lower curved segments and upper curved segments may be formed from sheet metal and joined to the forged components (interface portion 608 and mid-body support 504) at relatively low stress locations.

Figure 8:
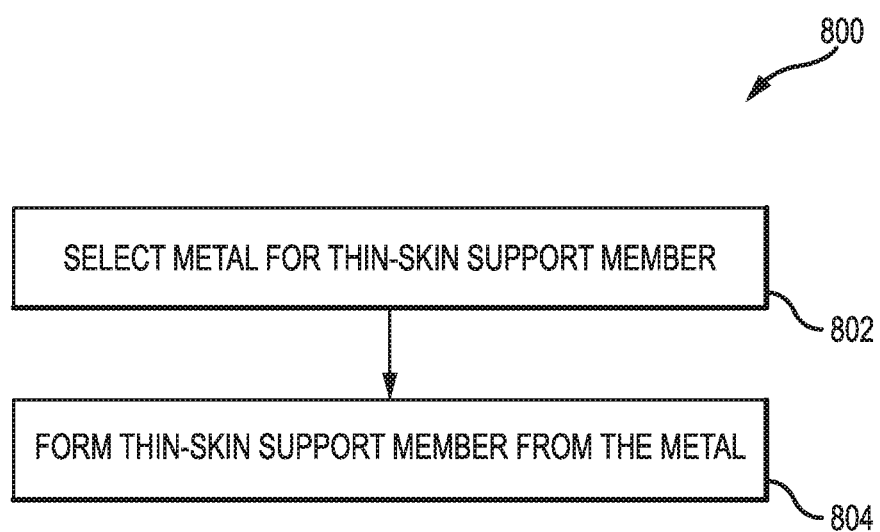
FIG. 8 illustrates a method of making a thin-skin support member using additive manufacturing techniques such as wire arc additive manufacturing (WAAM) and/or electron beam additive manufacturing (EBAM), in accordance with various embodiments.

With reference to FIG. 8, an exemplary process 800 for making thin skin landing gear is shown, in accordance with various embodiments. Any of the various embodiments described herein may be made using additive manufacturing techniques such as direct metal laser sintering, selective laser sintering, selective laser melting, electron-beam melting, electron-beam freeform fabrication, electron beam additive manufacturing (EBAM), or wire arc additive manufacturing (WAAM). WAAM and/or EBAM manufacturing may be used to provide advantageous metallurgic properties in the thin-skin support members disclosed herein. For example, tensile tests performed on rolled WAAM walls found that the properties of rolled WAAM walls were improved over standard rolled walls and became isotropic. The isotropic material may be worked using cold working process to refine the microstructure and improve the related mechanical properties, thereby making the material anisotropic. The thin-skinned support members described herein may be made using a grade 5 titanium WAAM deposit such as, for example, Ti-6Al-4V. Other titanium alloys may also be used to make thin-skinned support members using WAAM techniques.

The experimentally evaluated vertical and horizontal ensile properties of WAAM deposited 2319 aluminum alloy and wrought 2219 aluminum alloy are presented in table T1 below. The vertical (V) direction refers to samples taken across the build layers whilst the horizontal (H) direction refers to those taken along the layers. Yield strength (YS), ultimate tensile strength (UST), and elongation of the WAAM alloy are evenly distributed in the whole as-deposited wall. Average YS and UTS are 110 MPa (16.0 ksi) and 260 MPa (37.7 ksi), respectively. Although the strength values are lower than those of the T851-tempered alloy, they are 50% higher than those of the O-tempered alloy. Meanwhile, the 17% plastic elongation is higher than the T-tempered alloy, which may expand industrial application. In addition to the above mentioned improved metallurgic characteristics, the deposit width in WAAM manufacturing may be 3.5 mm (0.14 in) or lower, reducing the presence of excess material. In various embodiments, a WAAM deposited aluminum alloy such as the aluminum alloy described in table T1 may be used to make thin-skin support members of the present disclosure. The term approximately is used herein to describe a variance of +\−10% of the measured values in the tables below.

TABLE T1

Tensile properties of WAAM deposited 2319 alloy and wrought 2219 alloy

|  | WAAM Alloy | | | | | | Wrought Alloy | |
| --- | --- | --- | --- | --- | --- | --- | --- | --- |
|  | V1 | V2 | V3 | H1 | H2 | H3 | 2219-O | 2219-T851 |
| Yield Strength (Mpa) | 105 | 106 | 107 | 112 | 110 | 121 | 76 | 350 |
| Yield Strength (ksi) | 15.2 | 15.4 | 15.5 | 16.2 | 16 | 17.6 | 11 | 50.8 |
| UTS (Mpa) | 257 | 261 | 256 | 262 | 263 | 263 | 172 | 455 |
| UTS (ksi) | 37.3 | 37.9 | 37.1 | 38 | 38.1 | 38.1 | 25 | 66 |
| Elongation (%) | 15.4 | 16.8 | 14.4 | 18.3 | 19 | 17.8 | 18 | 10 |

In various embodiments, WAAM may be used to generate thin-skin support members with the above advantageous material properties including improved plastic elongation, UTS, and yield strength over the O-tempered counterpart. The improved material properties may enable thin-skin support member to meet standards for operation with reduced weight, as less material may be used in response to improved material properties. WAAM may also enable high build rates of approximately 20 pounds (9.1 kg) per hour.

Thus, in various embodiments, a thin-skinned support member 102 may be formed by selecting a suitable metal (Step 802). The metal may be an aluminum alloy, a titanium alloy, steel, or another suitable metal. The metal may also be suitable for e-beam additive manufacturing or WAAM techniques. The thin-skin support member may then be formed from the metal (Step 802). The thin-skin support member may define a hollow cavity and a cylindrical cavity proximate the hollow cavity, as described in detail above.

Components made using WAAM may include a grain structure grown in the direction of material being added. The surfaces of the landing gear components made with additive manufacturing may be smooth. Smooth surfaces and joints may refer to non-welded shapes. The landing gear components may also have continuous steps, flanges, and other structures that may be rough when welded. Furthermore, the landing gear components may have internal structural details that cannot be machined into the components due to lack of access.

Surfaces made using WAAM, EBAM, or similar weld-like techniques may deposit material in a series of cylindrical layers formed one on top of another. A wall formed by the techniques may thus have varying width corresponding to the cylindrical profile of each layer. The strength of the wall, however, may be limited by the thin portions of the wall. Thus, the excess material may be removed from each layer during the deposition process. In that regard, forming a thin skin landing gear of the present disclosure using WAAM and/or EBAM manufacturing may also include depositing a layer of material, removing excess material from the layer to give the layer a substantially uniform width, depositing another layer of the layer of uniform width, and removing excess material from the second layer to give the second layer a substantially uniform width. This process would be continued throughout the build of the entire part. In another embodiment of the build process, several layers of material could be deposited, followed by a clean-up process which would remove excess material from the entire wall surface, creating a wall with a substantially uniform width.

Thin-skinned support members of the present disclosure may tend to reduce weight and increase stiffness, as the curved surfaces and elongated geometry of thin-skinned members use less material to achieve acceptable support levels. The thin-skin support member may also tend to reduce turbulence of air passing by the deployed landing gear with its smooth surfaces and rounded contours. In that regard, thin-skin support members of the present disclosure may thus tend to minimize noise generated by air rushing past deployed landing gear assemblies. Additionally, the micro structure of the thin-skinned support members may be improved using additive manufacturing techniques.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thin-skin support member, comprising:
a semi-circular edge and an elongated surface that define a hollow cavity;
a cylindrical cavity adjacent the hollow cavity and at least partially defined by the semi-circular edge, wherein the cylindrical cavity is configured to retain a strut assembly;
a mounting interface coupled to the semi-circular edge and the elongated surface;
a torsion interface disposed adjacent the cylindrical cavity and configured to receive a torsion link, wherein the thin-skin support member has a grain structure grown in the direction of material being added; and
a cutaway section on an open upper end of the thin-skin support member, wherein an external boundary of the upper open end comprises the cutaway section.

2. The thin-skin support member of claim 1, wherein the thin-skin support member is made using wire arc additive manufacturing.

3. The thin-skin support member of claim 2, further comprising at least one of aluminum or titanium.

4. The thin-skin support member of claim 3, wherein a deposit width of the wire arc additive manufacturing is 3.5 mm or less.

5. The thin-skin support member of claim 1, further comprising a mid-body support, wherein the cylindrical cavity extends from the mid-body support.

6. The thin-skin support member of claim 1, wherein the elongated surface has a yield strength ranging from approximately 105 MPa to 121 MPa.

7. The thin-skin support member of claim 6, wherein the elongated surface has an ultimate tensile strength ranging from approximately 257 MPa to 263 MPa.

8. The thin-skin support member of claim 1, further comprising a second semi-circular edge that is spaced from the semi-circular edge in a dimension that corresponds with a pivot axis for the mounting interface, wherein the hollow cavity is further defined by the second semi-circular edge, and wherein one of the semi-circular edge and the second semi-circular edge defines a leading edge of the thin-skin support member and the other of the semi-circular edge and the second semi-circular edge defines a trailing edge of the thin-skin support member in a deployed configuration of the thin-skin support member.

9. The thin-skin support member of claim 8, wherein the semi-circular edge and the second semi-circular edge are convex on an exterior of the thin-skin support member.

10. A landing gear assembly, comprising:
a thin-skin support member defining a hollow cavity and a cylindrical cavity, wherein the thin-skin support member has a grain structure grown in a direction of material being added, wherein the thin-skin support member further comprises a cutaway section on an of the thin-skin su ort member and wherein an external boundary of the upper open end comprises the cutaway section;
a cylinder extending from the cylindrical cavity;
an axle extending from the cylinder; and
a torsion link coupled to the axle and a torsion interface of the thin-skin support member.

11. The landing gear assembly of claim 10, wherein the thin-skin support member is made using wire arc additive manufacturing.

12. The landing gear assembly of claim 11, further comprising at least one of aluminum or titanium.

13. The landing gear assembly of claim 12, wherein a deposit width of the wire arc additive manufacturing is 3.5 mm or less.

14. The landing gear assembly of claim 12, further comprising a mid-body support, wherein the cylindrical cavity extends from the mid-body support.

15. The landing gear assembly of claim 12, wherein an edge of the thin-skin support member has a yield strength ranging from approximately 105 MPa to 121 MPa.

16. The landing gear assembly of claim 15, wherein the edge has an ultimate tensile strength ranging from approximately 257 MPa to 263 MPa.

17. The landing gear assembly of claim 12, wherein the thin-skin support member comprises a mounting interface configured for coupling to an aircraft.

18. The landing gear of claim 17, wherein the thin-skin support member further comprises a first semi-circular edge and a second semi-circular edge that are spaced from one another in a dimension that corresponds with a pivot axis for the mounting interface.

19. The landing gear of claim 18, wherein the semi-circular edge and the second semi-circular edge are convex on an exterior of the thin-skin support member.

20. The landing gear of claim 18, wherein the pivot axis is orthogonal to the axle.

* * * * *